(12) United States Patent
Alling

(10) Patent No.: US 6,224,267 B1
(45) Date of Patent: May 1, 2001

(54) TRANSLATING ROTATING THRUST BEARING

(75) Inventor: Richard L. Alling, Torrington, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/376,694

(22) Filed: Aug. 18, 1999

Related U.S. Application Data

(60) Provisional application No. 60/099,052, filed on Sep. 3, 1998.

(51) Int. Cl.[7] .................................................. F16C 19/30
(52) U.S. Cl. .................................................. 384/618
(58) Field of Search .................................. 384/590, 609, 384/615, 618, 619, 620, 621, 622

(56) References Cited

U.S. PATENT DOCUMENTS

| | | |
|---|---|---|
| 0,984,855 | 2/1911 | Schaffnit . |
| 3,829,181 | * 8/1974 | Gunther et al. ............... 384/622 X |
| 3,981,549 | * 9/1976 | Carullo ............................ 384/622 |
| 4,076,338 | 2/1978 | Hisey . |
| 4,089,371 | 5/1978 | Decuir, Sr. . |
| 4,254,532 | 3/1981 | Hager . |
| 4,515,415 | 5/1985 | Szenger . |
| 4,579,395 | 4/1986 | Teramachi . |
| 4,619,628 | 10/1986 | Orain . |
| 4,867,579 | 9/1989 | Gallone . |
| 5,097,565 | 3/1992 | Shorey . |
| 5,248,203 | 9/1993 | Agari . |
| 5,328,269 | 7/1994 | Mutolo et al. . |
| 5,362,156 | 11/1994 | Hara . |
| 5,388,914 | 2/1995 | Takei . |
| 5,494,353 | 2/1996 | Diemer . |
| 5,672,012 | 9/1997 | Malone . |
| 5,685,646 | 11/1997 | Gilbert . |
| 5,829,890 | 11/1998 | Bauer et al. . |
| 5,875,518 | 3/1999 | Walker . |

\* cited by examiner

Primary Examiner—Thomas R. Hannon
(74) Attorney, Agent, or Firm—John C. Bigler

(57) ABSTRACT

First and second raceways are positioned against a needle roller and cage subassembly, having needle rollers arranged in a plane along a pitch circle and retained within a cage, such that the rollers facilitate free rotation of the second raceway relative to the first raceway when a thrust load is applied through the first and second raceways. At least one of the first and second raceways has a recessed portion such that diametrically opposite rollers are loaded when the thrust load is applied while other rollers are unloaded, thereby facilitating linear translation of the second raceway relative to the first raceway.

8 Claims, 6 Drawing Sheets

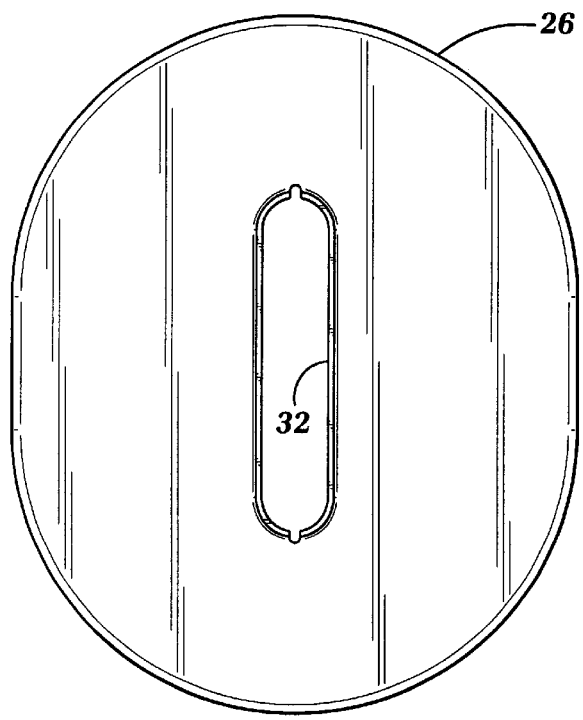
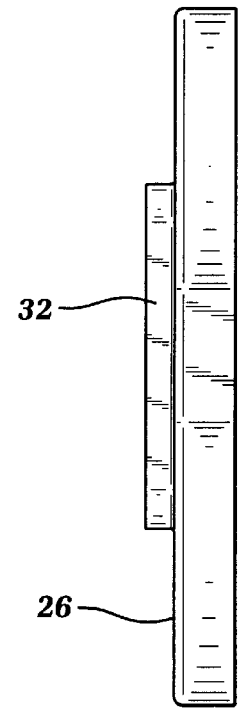
Fig. 6           Fig. 7
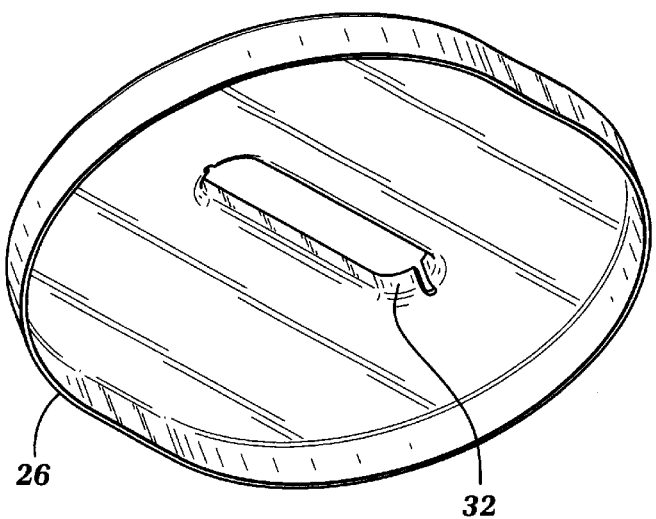
Fig. 8

TRANSLATING ROTATING THRUST BEARING

This Appln claims benefit of U.S. Provisional No. 60/099,052 filed Sep. 3, 1998.

BACKGROUND OF THE INVENTION

This invention relates generally to thrust bearings and, more particularly, to needle roller thrust bearing assemblies allowing motion other than pure rotation.

Typical needle roller thrust bearing assemblies provide axial thrust load support for static and rotational conditions, only. There is no provision in such bearing assemblies for translation of one thrust face relative to an opposed thrust face. However, in some specific applications, an additional axis of motion would enhance performance of the thrust bearing assembly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a needle roller thrust bearing assembly comprising a needle roller and cage subassembly having needle rollers arranged in a plane along a pitch circle and retained within a cage. First and second raceways are positioned against the rollers, with the roller and cage subassembly between the raceways, such that the rollers facilitate free rotation of the second raceway relative to the first raceway when a thrust load is applied through the first and second raceways. At least one of the first and second raceways has a recessed portion such that diametrically opposite rollers are loaded when the thrust load is applied while other rollers are unloaded, thereby facilitating linear translation of the second raceway relative to the first raceway.

The foregoing and other aspects will become apparent from the following detailed description of the invention when considered in conjunction with the accompanying drawing figures.

BRIEF DESCRIPTION OF THE DRAWING FIGURES

FIG. 6 is a top view of a flanged member of the thrust bearing assembly of FIG. 1;

FIG. 7 is a side view of the flanged member of FIG. 6;

FIG. 8 is a pictorial view showing the sides and bottom of the flanged member of FIG. 6;

Please note that the needle roller thrust bearing assembly of the present invention could be mounted in any orientation and that the reference to top and side views is for convenience only.

DETAILED DESCRIPTION

Figure 1:
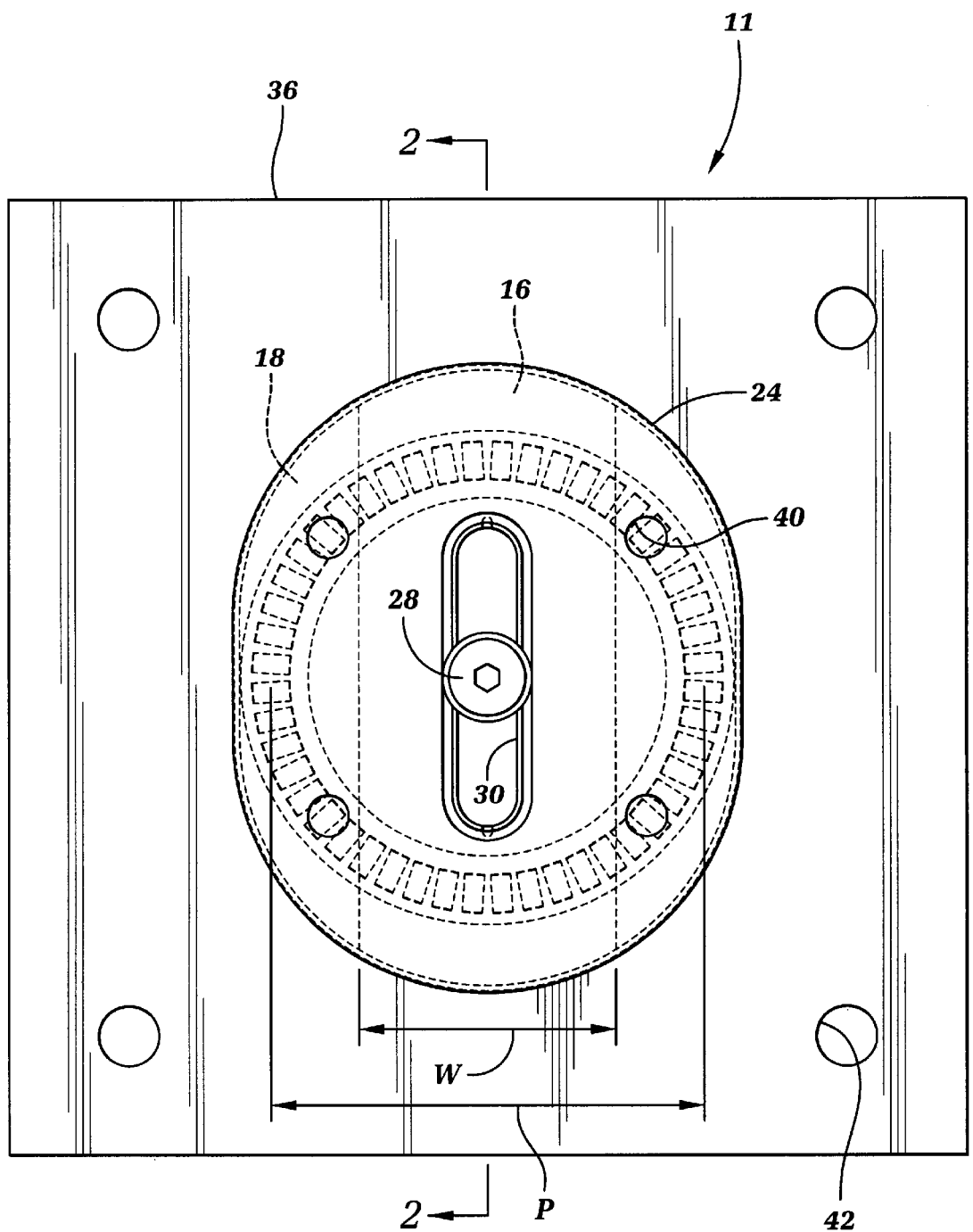
FIG. 1 is a top view of a needle roller thrust bearing assembly illustrating one embodiment of the present invention.
Figure 2:
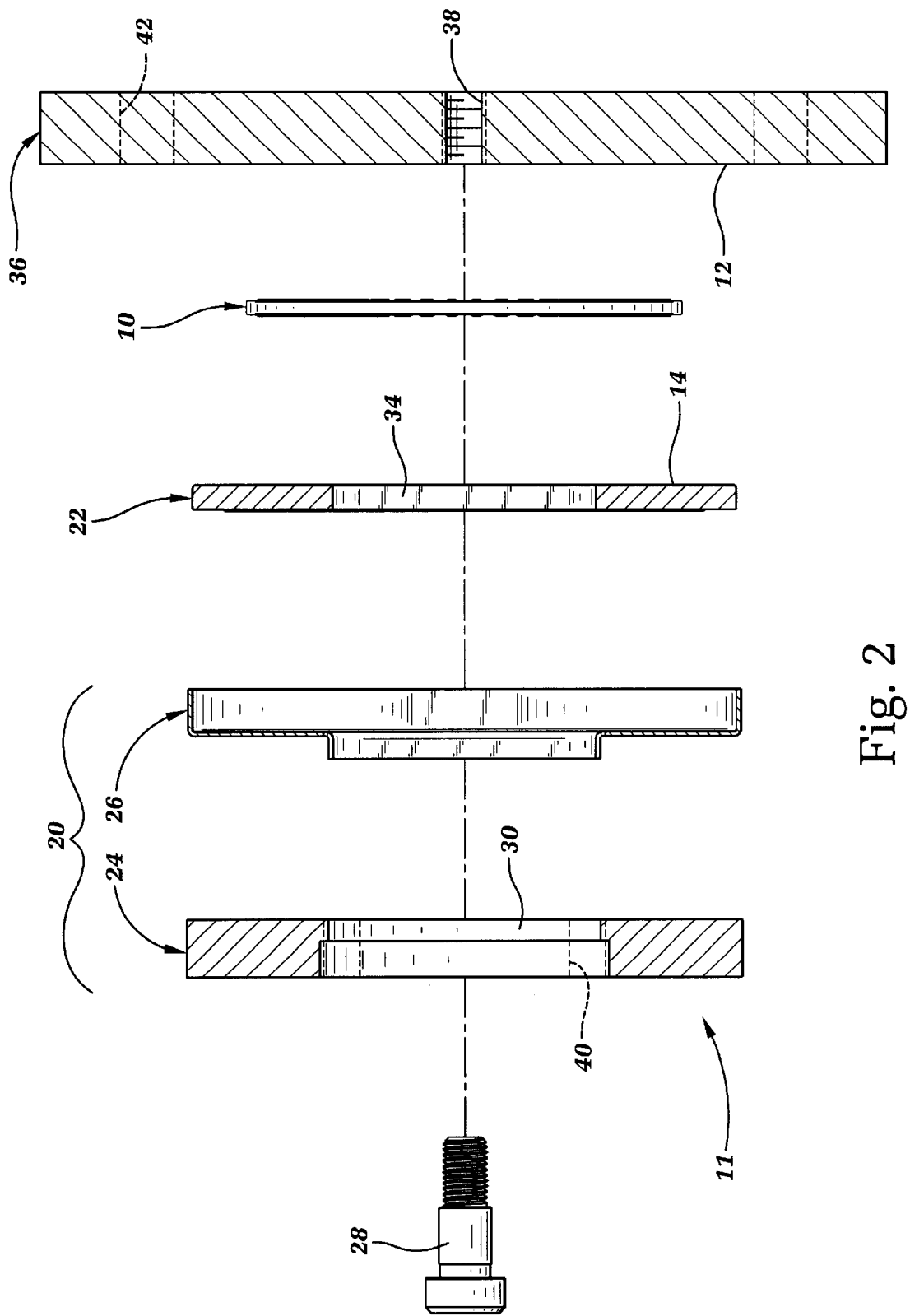
FIG. 2 is an exploded sectional view of the thrust bearing assembly of FIG. 1, along the line 2—2.
Figure 3:
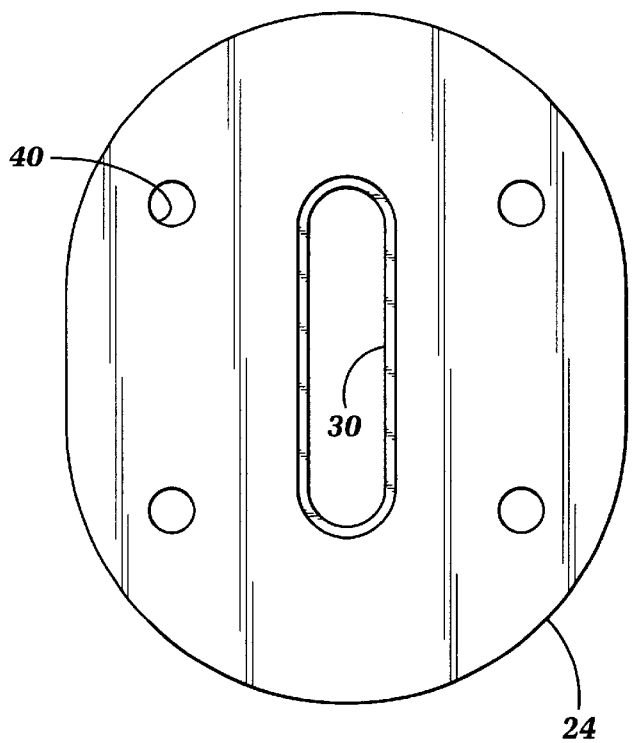
FIG. 3 is a top view of a backing member of the thrust bearing assembly of FIG. 1.
Figure 4:
FIG. 4 is a side view of the backing member of FIG. 3.
Figure 5:
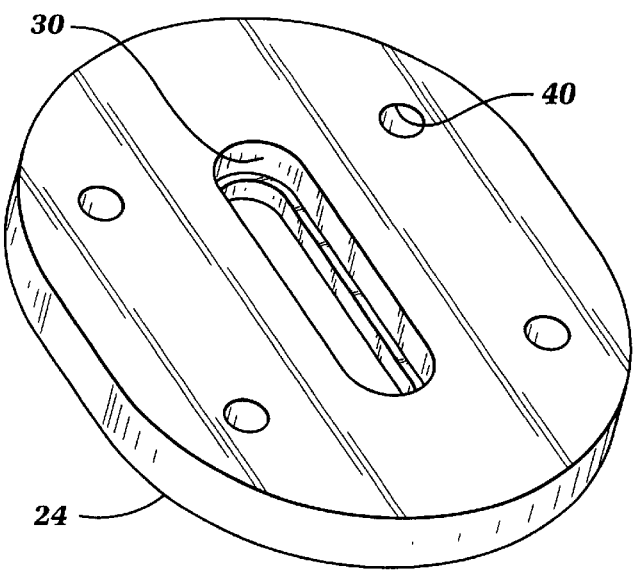
FIG. 5 is a pictorial view showing the top and sides of the backing member of FIG. 3.
Figures 9, 10:
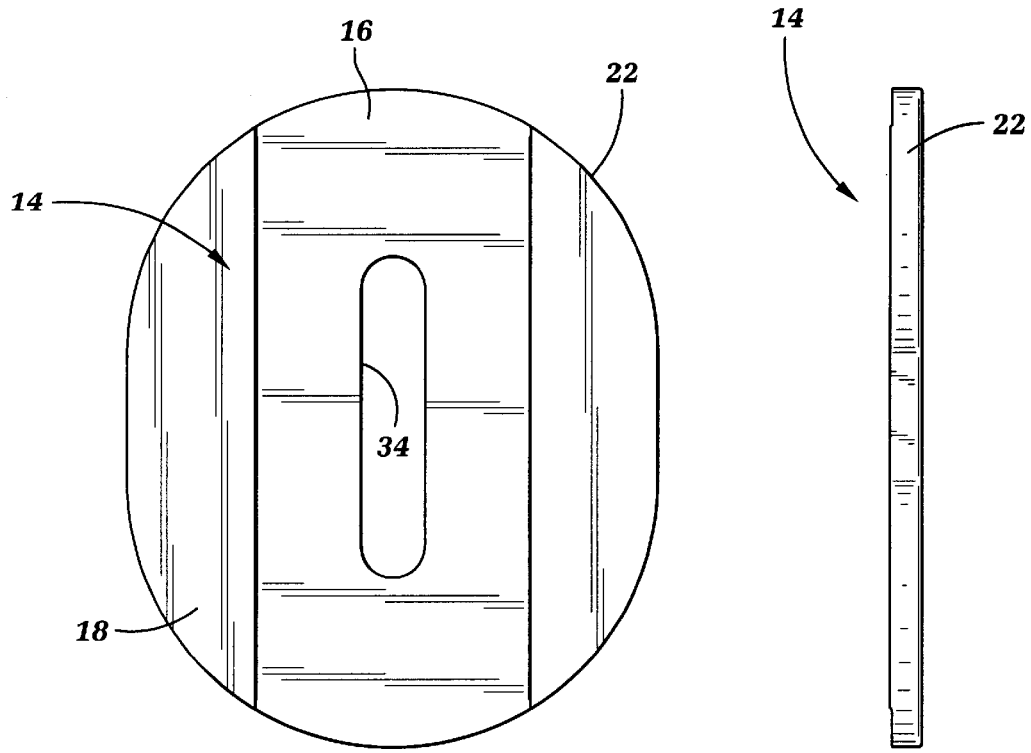
FIG. 9 is a bottom view of a race member of the thrust bearing assembly of FIG. 1.
FIG. 10 is a side view of the race member of FIG. 9.
Figure 11:
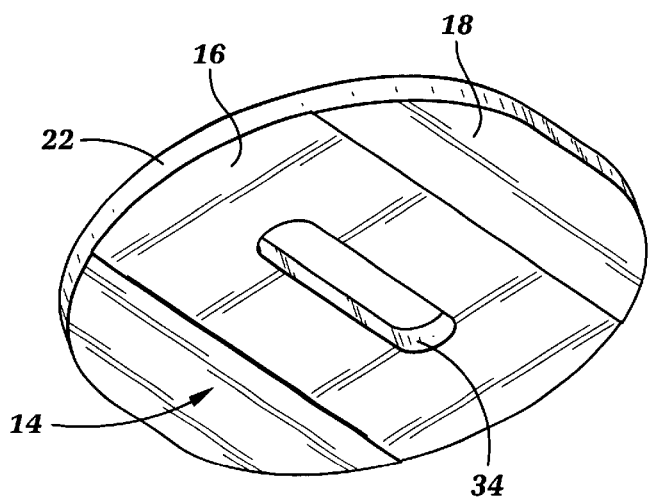
FIG. 11 is a pictorial view showing the sides and bottom of the race member of FIG. 9.
Figure 12:
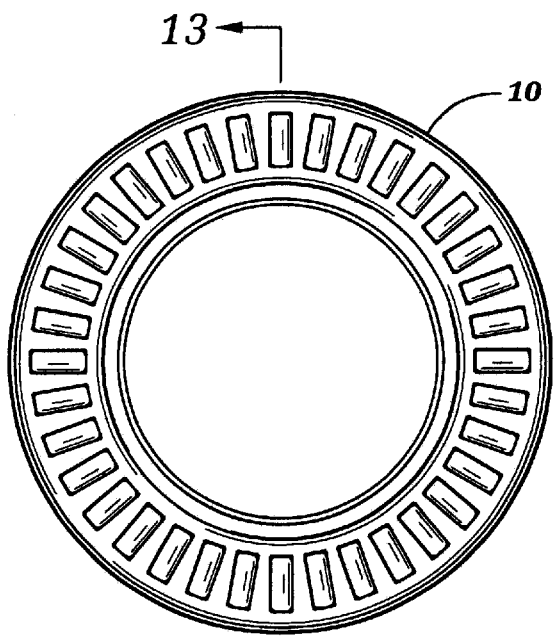
FIG. 12 is a top view of a roller and cage subassembly of the thrust bearing assembly of FIG. 1.
Figure 13:
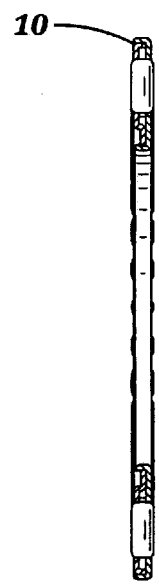
FIG. 13 is a sectional view of the roller and cage subassembly of FIG. 12, taken along the line 13—13.
Figure 14:
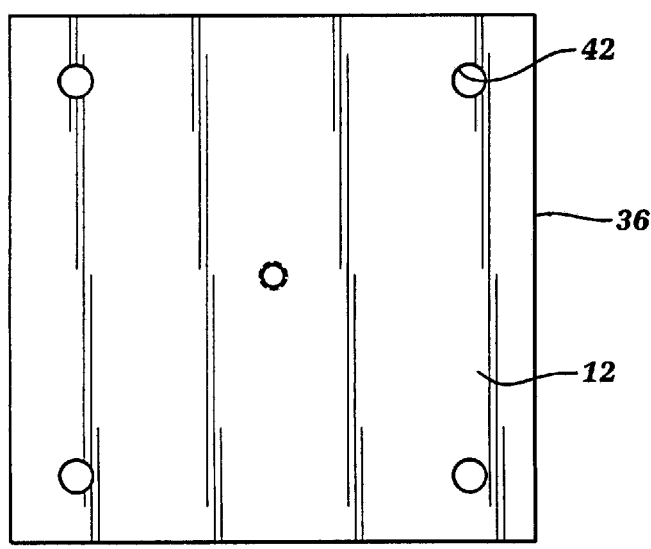
FIG. 14 is a top view of a mounting plate of the thrust bearing assembly of FIG. 1.
Figure 15:
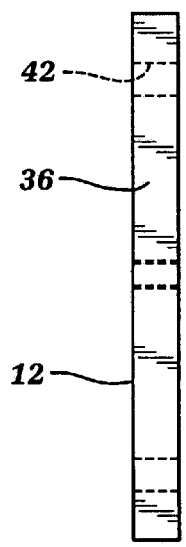
FIG. 15 is a side view of the mounting plate of FIG. 14.

Referring now to the drawings, FIGS. 1 and 2 illustrate a needle roller thrust bearing assembly 11, illustrating one embodiment of the present invention, comprising a roller and cage subassembly 10, a mating flat raceway 12, and an opposing oblong raceway 14 incorporating a channel relief 16 forming a recess along the raceway's longitudinal axis.

The width W of the channel relief 16 may vary depending on the pitch diameter P of the rollers, the roller length, the cage design and other factors. However, for roller and cage subassemblies with conventional cage construction and normal proportions, the width W of the channel relief 16 would be, generally, about half the pitch diameter P.

The channel relief 16 provides a zone of zero loading of the needle rollers in the cage sectors where linear motion is approximately parallel to the needle roller elements' longitudinal axes. Roller loading in sectors overlying channel relief 16 during such translation would be detrimental to anti-friction performance of the caster assembly. A few of the needle rollers in the non-relieved raceway contact zones 18 are subjected to pure rolling motion, and the remainder of the needle rollers in the contact zones 18 are subjected to a tolerable combination of rolling and skidding.

Thus, the recessed portion of the oblong raceway 14 causes diametrically opposite rollers to be loaded when the thrust load is applied while other rollers are unloaded, thereby facilitating linear translation of the oblong raceway 14 relative to the flat raceway 12. To minimize stress produced by the modest end slot thrusting of the needle rollers in the non-relieved raceway contact zones 18 closest to the channel relief 16, the cage could include cage inserts or wrap-around pockets.

The opposing raceways 12 and 14 may be constructed and mounted such that the channel-grooved oblong raceway 14 is allowed to translate relative to the unrelieved flat raceway surface 12 in the a direction of its grooved longitudinal axis. For example, a flanged component 20, having a width approximating the outside diameter of the roller and cage subassembly 10 and a length greater than the outside diameter of the roller and cage subassembly, may be provided to contain an oblong race member 22 providing the oblong raceway 14. Flanged component 20 may be formed of two pieces, an oblong backing member 24 and a flanged member 26.

A pivot pin, e.g. shoulder screw 28, may be inserted through the flanged component 20, forming a clearance-fit within oblong slots 30, 32 and 34 of the oblong backing member 24, the flanged member 26 and the oblong race member 22, respectively. The pivot pin may be threaded into a tapped hole 38 in a mounting plate 36 that provides the flat raceway surface 12, thereby holding the components together as an assembly that allows the captured roller and cage subassembly to operate in rotation and limited translation.

Although the oblong members of the illustrated embodiment have a length to width ratio of approximately 1.3:1, other ratios may be used to provide translation, depending on the outside diameter of the roller and cage subassembly 10 and the desired length of linear translation to be provided.

FIGS. 3 through 15 illustrate the flanged component 20, the oblong race member 22, the oblong backing member 24, the flanged member 26, the roller and cage subassembly 10, and the mounting plate 36 of this embodiment of the invention. The oblong backing member 22 and the mounting plate 36 may be provided with mounting holes 40 and 42, respectively, for fixing the needle roller thrust bearing assembly 11 as required in various applications.

The present invention is a needle roller thrust bearing assembly with integral geometry providing axial thrust load support under static, rotational motion, and linear motion conditions. The additional axis of motion (i.e., linear translation) provided by this needle roller thrust bearing assembly allows both rotational and linear motion through the use of a single low-height, high-load-capacity bearing assembly.

Multiple thrust bearing assemblies could be stacked or linearly aligned to permit specific translation and rotation patterns. A spring preload bearing lockout or a clutch device could be constructed wherein a specific amount of rotation would be required before translation along a predetermined ray could occur. A no-stall wheeled caster assembly, a translating-rotating seat-supporting mechanism, and position devices for robotics are other possible applications for this invention.

Many design alternatives are anticipated with the present invention to provide the desired translational and rotational capabilities of a needle roller thrust bearing assembly. A principal concept of the invention is the relieved or grooved raceway that, without sacrifice to rotational capability, allows a reduced-friction translation of opposite surfaces of a thrust-loaded roller bearing assembly in a direction parallel to the grooved race long axis.

Having described the invention, what is claimed is:

1. A needle roller thrust bearing assembly comprising:
   a needle roller and cage subassembly having needle rollers arranged in a plane along a pitch circle and retained within a cage; and
   first and second raceways positioned against the rollers, with the roller and cage subassembly between the raceways, such that the rollers facilitate free rotation of the second raceway relative to the first raceway when a thrust load is applied through the first and second raceways;
   at least one of the first and second raceways having a recessed portion such that diametrically opposite rollers are loaded when the thrust load is applied while other rollers are unloaded, thereby facilitating linear translation of the second raceway relative to the first raceway.

2. The needle roller thrust bearing assembly according to claim 1, wherein the second raceway is substantially flat except for a recess centered over the center of the pitch circle of the rollers and having a width extending along a longitudinal axis.

3. The needle roller thrust bearing assembly according to claim 2, wherein the width of the recess of the second raceway is approximately half a diameter of the pitch circle.

4. The needle roller thrust bearing assembly according to claim 1, further comprising retention means for retaining the roller and cage subassembly such that linear translation of the roller and cage subassembly is limited.

5. The needle roller thrust bearing assembly according to claim 4, wherein the retention means includes a flange adjacent to the second raceway and engageable with the roller and cage subassembly to guide the roller and cage subassembly.

6. The needle roller thrust bearing assembly according to claim 4, wherein the retention means includes a flanged component enclosing the second raceway and providing a flange adjacent engageable with the roller and cage subassembly to guide the roller and cage subassembly.

7. The needle roller thrust bearing assembly according to claim 6, further comprising a pivot pin fixed to the first raceway and engageable with a slot in the flanged component to guide the flanged component along an axis.

8. The needle roller thrust bearing assembly according to claim 1, wherein the second raceway is oblong, having a longer dimension in a direction of the linear translation of the second raceway relative to the first raceway.

* * * * *